United States Patent [19]

Harasim et al.

[11] Patent Number: 4,699,468
[45] Date of Patent: Oct. 13, 1987

[54] LIQUID CRYSTAL MODULATOR FOR THE TRANSMISSION OF INFORMATION, INCLUDING SPEECH, IN THE VISIBLE AND INFRARED RANGE

[75] Inventors: Anton Harasim, Taufkirchen; Klaus Dietrich, Gauting, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 811,668

[22] Filed: Dec. 20, 1985

[30] Foreign Application Priority Data

Dec. 20, 1984 [DE] Fed. Rep. of Germany ....... 3446474

[51] Int. Cl.$^4$ .......................... G02F 1/13; G02F 1/00; H04B 9/00
[52] U.S. Cl. ..................... 350/332; 350/335; 350/346; 455/618; 455/619; 370/3
[58] Field of Search ............... 350/332, 335, 346, 330, 350/358; 370/3; 455/618, 619

[56] References Cited

U.S. PATENT DOCUMENTS

| | | | |
|---|---|---|---|
| 4,131,791 | 12/1978 | Lego, Jr. ............................ | 350/332 |
| 4,278,328 | 7/1981 | Mukoh et al. ...................... | 350/346 |
| 4,385,806 | 5/1983 | Fergason ............................ | 350/332 |
| 4,436,376 | 3/1984 | Fergason ............................ | 350/332 |
| 4,540,243 | 9/1985 | Fergason ............................ | 350/332 |

Primary Examiner—Stanley D. Miller
Assistant Examiner—Trong Quang Phan
Attorney, Agent, or Firm—W. G. Fasse; D. H. Kane, Jr.

[57] ABSTRACT

A liquid crystal light modulator is constructed for the transmission of speech signals modulated onto a light carrier passing through gaseous, liquid, and solid media such as air, water, or glass. A large surface area modulation of the light is accomplished in the visible and infrared range over narrow, however adjustable, wave length ranges or widths. Several circuit arrangements for such modulators are disclosed and their function described.

12 Claims, 16 Drawing Figures

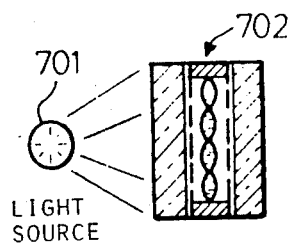
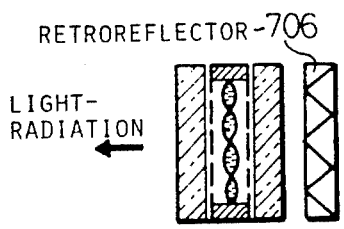
FIG. 7a  FIG. 7b  FIG. 7c
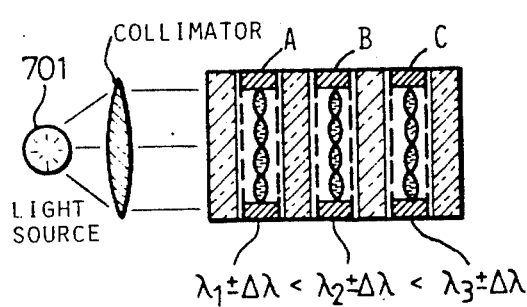
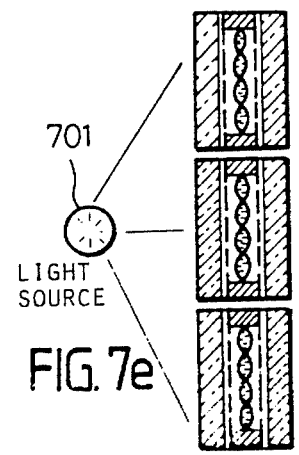
FIG. 7d  FIG. 7e
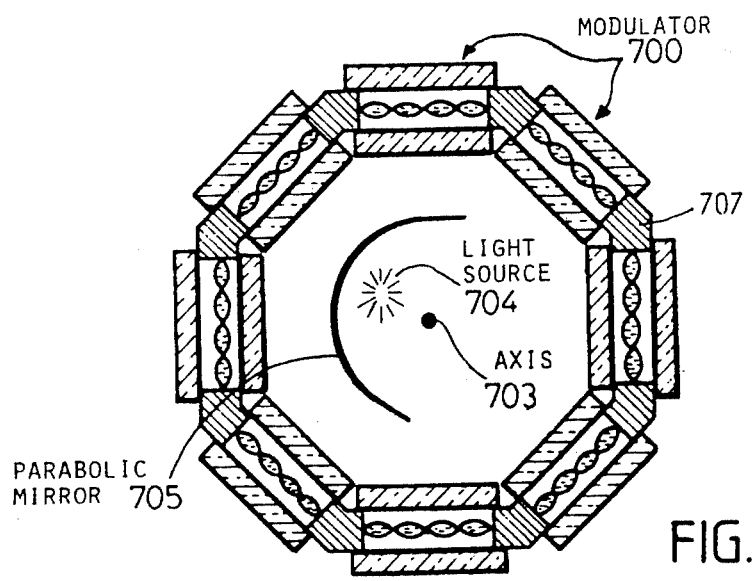
FIG. 7f

LIQUID CRYSTAL MODULATOR FOR THE TRANSMISSION OF INFORMATION, INCLUDING SPEECH, IN THE VISIBLE AND INFRARED RANGE

FIELD OF THE INVENTION

The invention relates to a liquid crystal light modulator operating on the basis of wave length range selection and capable of single or multi-channel transmission of speech or other analog or digital information signals by means of light passing through solid, gaseous, or liquid media.

DESCRIPTION OF THE PRIOR ART

Liquid crystal cells have been used predominantly in display devices. Such devices do not rely for their operation on a speedy signal processing, rather, they require a steep electro-optical characteristic for achieving high multiplex rates. In most instances the frequency of the alternating voltage is without any operational significance. The frequency of the signals used in such liquid crystal display devices serves only for the purpose of avoiding electrolytic decomposition of the liquid crystal mixture.

It is further known that liquid crystal mixtures can be doped with cholesteric substances for avoiding the so-called "anti-reserve twisting" in rotational cells operating in accordance with the Schadt-Helfrich effect. Such cholesteric doping substances are also used for achieving the so-called guest/host effects in order to provide the liquid crystal mixtures in the cell arrangement with a twisting. However, in the just described applications of cholesteric doped mixtures, neither a linear characteristic nor the rapid modulation is to be achieved for the transmission of speech. In any of the conventional applications of liquid crystal effects modulation switching times are achievable which, at best, are in the millisecond range. This is true for the "twisted nematic mode", for the guest/host effect, for the cholesteric-nematic phase change transition, for deterioration of aligned phases, and so forth.

OBJECTS OF THE INVENTION

In view of the foregoing it is the aim of the invention to achieve the following objects singly or in combination:

to provide a liquid crystal modulator capable of modulating light linearly over a large surface area in the visible or infrared range;

to provide the light modulation in a narrow, yet adjustable wave length range in liquid crystals, whereby the modulation band width should cover a range of at least several kilo Herz in order to transmit speech and/or other information; and to provide for a multi-channel information transmission by using wide band light sources such as incandescent light bulbs.

SUMMARY OF THE INVENTION

The above objectives have been achieved according to the invention by using a liquid crystal mixture for making a liquid crystal layer, for example, of the nematic type doped with cholesteric substances. The liquid crystal layer is so doped that in the alternating field it has a helical structure having a pitch "p", corresponding approximately to the wave length λ of the light to be modulated. This type of liquid crystal layer is located between at least two glass plates or other material transparent for the respective wave length range. The glass plates or other material layers are provided with conducting, transparent electrodes and are spaced from one another by spacer members. The so constructed liquid crystal modulator cell is operated by means of an alternating voltage. The analog or digital signal to be used for the modulation is superimposed or added to the operating alternating voltage in the proper phase relationship. The frequency and the effective operating voltage are so selected that the modulation depth is sufficient for the particular type of liquid crystal mixture used.

Advantages of the light modulator according to the invention are seen in that the modulator is optimally suitable for the single-channel and multi-channel information transmission in different media, including a vacuum and over distances of several kilometers in a band width of more than 10 kHz. The linear modulation is possible in a narrow band width in the visible and in the infrared range, for example, at 8 to 12 microns wave length. The invention realizes the physical recognition that the scattering or dispersion of a cholesteric doped liquid crystal mixture is at a maximum when the pitch of the helical structure and the size of the helices are in the same order of magnitude as the wave length. The liquid crystal texture used is a focal, conical texture of cholesteric phases which are kept in continuous dynamic movement by the application of the alternating voltage. However, the transition from the cholesteric type status into the nematic status does not take place. Such a transition is avoided since it would be disturbing for achieving the purposes of the invention. The invention uses these physical facts for the rapid modulation of the light.

BRIEF DESCRIPTION OF THE DRAWINGS

In order that the invention may be clearly understood, it will now be described, by way of example, with reference to the accompanying drawings, wherein:

FIG. 7a shows an embodiment of a modulator with a light bulb

FIG. 7b shows a modulator with a laser;

FIG. 7c shows a modulator with a retroreflector;

FIG. 7d shows a multi-channel transmission system in which the liquid crystal modulator cells are arranged in a row;

FIG. 7e illustrates a multi-channel transmission system in which the liquid crystal modulator cells are arranged in a column;

FIG. 7f illustrates the arrangement of eight liquid crystal modulator cells arranged along the sides of an octagonal for a panorama type transmission with the light source arranged inside of the octagonal;

FIG. 9a is a schematic illustration of a plan view, partially in section, of a liquid crystal cell with two photodetectors for reducing the distortion factor in a circuit arrangement as shown in FIG. 8; and FIG. 9b is a sectional view along section line A—A in FIG. 9a.

DETAILED DESCRIPTION OF PREFERRED EXAMPLE EMBODIMENTS AND OF THE BEST MODE OF THE INVENTION

Figure 1:
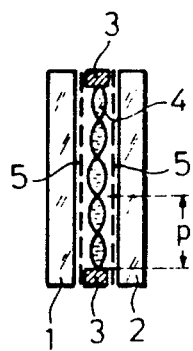
FIG. 1 is an elevational view of a liquid crystal modulator cell according to the invention.

The schematic illustration of FIG. 1 shows a liquid crystal modulator comprising two or more parallel arranged glass plates 1, 2 spaced from each other by spacer members 3. Each glass plate is coated with a transparent, electrically conducting electrode layer 5 facing toward the neighboring glass plate across the gap formed by the spacer members 3. The gap is filled with a liquid crystal layer 4 comprising a nematic liquid crystal doped with cholesteric substances so that the resulting pitch "p" of the helical structure formed corresponds closely to the wave length $\lambda$ of the light to be modulated onto a carrier, when the alternating field without the modulation signal is applied to the cell to achieve high constrast. The doping of the nematic liquid crystal by a cholesteric type dopant assures a short switch-off time. The doping density depends on the p.c-product, which is characteristic for a special cholesteric material. For Merek's CB15 for example p.c=13.5 (p=pitch in $\mu$m, c=concentration in percent). In order to dope a mixture with $p \approx \lambda$, the concentration has to be $c[\%] = 13.5/\lambda[\mu m]$ in the case of CB15. The switch-on time is influenced by the size of the voltage applied to the liquid crystal and by the thickness of the liquid crystal layer in the gap 4. The thickness of the liquid crystal layer in the described example is 6 $\mu$m. Due to this thickness it is possible to keep the voltage level in the range of the voltages applied to CMOS-circuits. A liquid crystal cell constructed as shown in FIG. 1 operates in the so-called scattering or dispersion mode without polarizers. The scattering or dispersion has its maximum for a given wave length when the above mentioned condition that the pitch "p" equals the wave length $\lambda$ is satisfied. The useable wave length range is limited by the optical anisotropy of the liquid crystal substance. Outside this wave length range the modulation is no longer pronounced.

Figure 2:
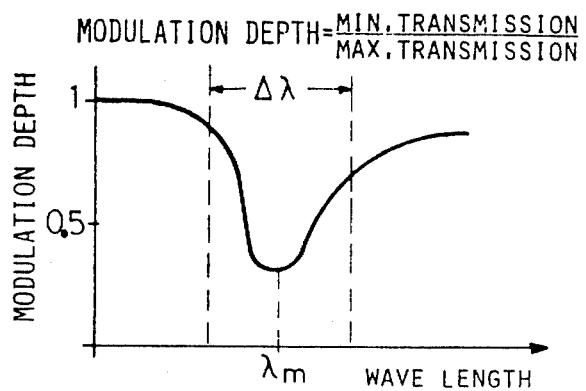
FIG. 2 is a typical transmission characteristic of the modulator according to FIG. 1 showing the modulation depth as a function of the wave length.

FIG. 2 shows schematically a typical filter or transmission curve of such a modulator, whereby the modulation depth is illustrated as a function of the wave length. If such a liquid crystal cell as shown in FIG. 1 should not be sufficient to achieve the required high modulation depth, then several such cells may be arranged in series as shown in FIG. 7d, e.g.

Figure 3A:
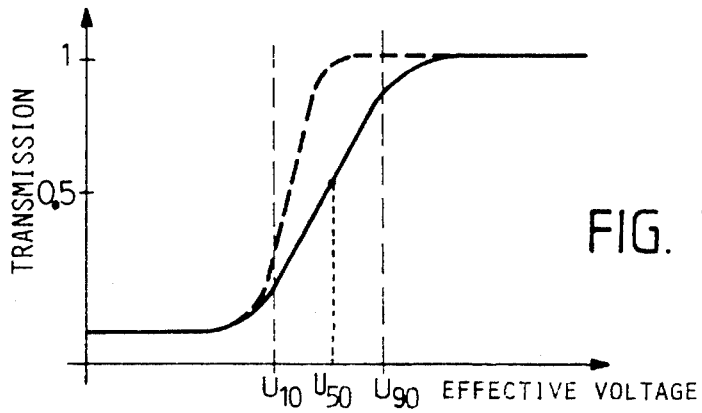
FIG. 3a shows the transmission factor as a function of the effective voltage applied to the modulator.
Figure 3B:
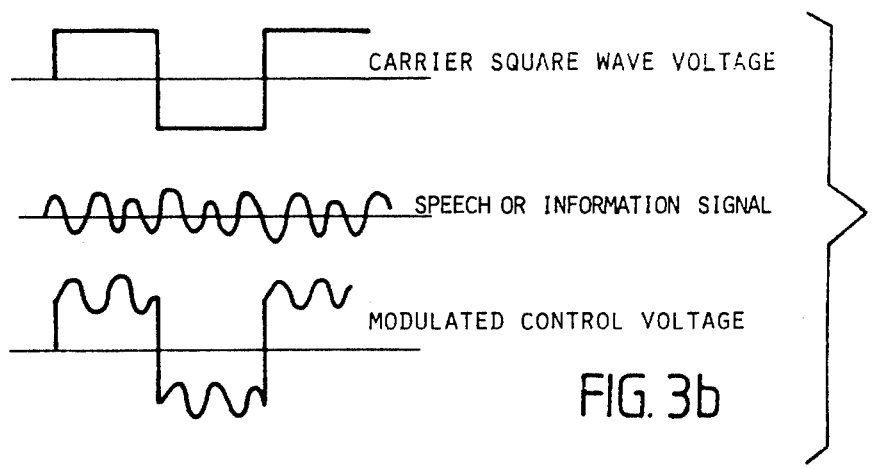
FIG. 3b shows a diagram of the wave forms of the voltages occurring in a modulator according to the invention including the speech or information signal.
Figure 4:
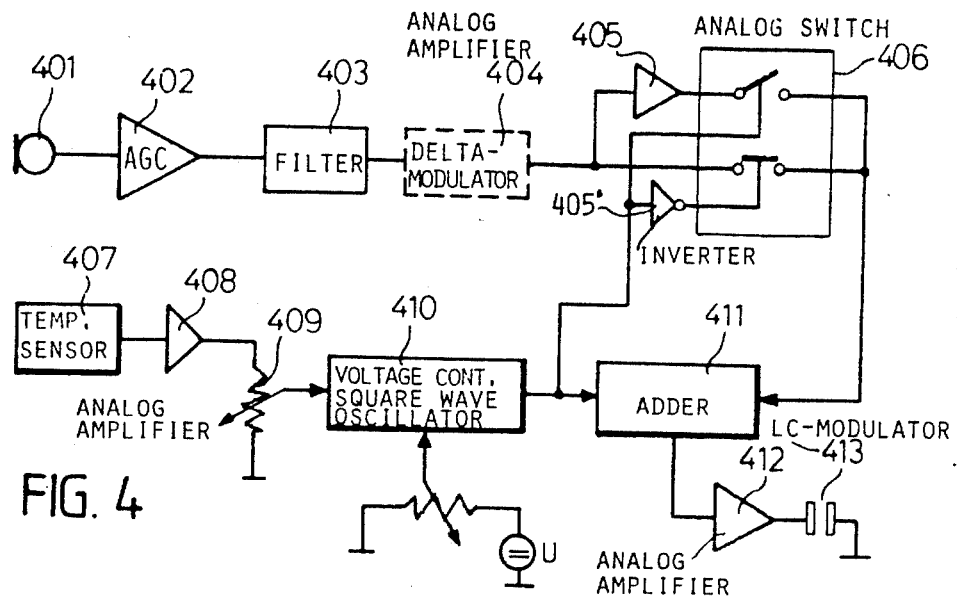
FIG. 4 is a block circuit diagram of an embodiment of the invention for the transmission of speech.

Generally, liquid crystal substances doped by a cholesteric dopant exhibit an hysteresis characteristic which has an undesirable effect on the intended modulation. However, operating in the dashed section of the transmission characteristic curve of FIG. 3a can be avoided by utilizing only about 90% of the linear, full line branch of the curve. The limiting of the excitation voltage to the proper range can be achieved, for example, by means of an automatic gain control circuit AGC 402 shown in FIG. 4. The working or operating point $U_{50}$ of the LC modulator 413 in FIG. 4 is adjusted with the aid of a voltage controlled square wave oscillator 410. The square wave oscillator 410 oscillates symmetrically relative to zero voltage, top curve in FIG. 3b.

Referring further to FIG. 4, the frequency of the square wave oscillator 410 is first adjusted with the aid of the potentiometer 409 to the maximum modulation depth, whereupon the frequency is automatically modified by the temperature sensor 407 and the analog amplifier 408. The information signal or, in this instance, the speech signal to be transmitted is produced by the microphone 401 connected to an automatic gain control amplifier 402, the output of which is connected through a filter 403 to an analog switch circuit 406. If desired, a delta modulating circuit 404 may be inserted between the filter 403 and the analog switch 406 for the purpose of assuring a transmission through the atmosphere free of interferences. Such delta modulators and methods are well known in the art and the respective modulators may be bought as a shelf item. The filter 403 is so constructed that its characteristic takes the type of transmission medium into account. For example, if the transmission medium is air, the filter 403 should be a conventional band mirror filter which transforms the low frequencies into high frequencies and vice versa. A scrambling filter could also be used as the filter 403 if the information to be transmitted is to be scrambled to protect the transmission against undesirable listening-in. For example, a Ginzburg filter is suitable for this purpose. The so processed information signal is then supplied through the analog switch 406 to the adder 411 which adds the information signal in proper phase relationship to the carrier square wave shown at the top of FIG. 3b and supplied by the voltage controlled square wave oscillator 410. The information signal is shown in the middle of FIG. 3b. The phase of the information signal to be transmitted is amplified by the analog amplifier 405 and inverted by the inverter 405', both of which are connected to the switch 406. The output of the adder 411 is supplied through an analog amplifier 412 to the LC modulator 413.

Figure 5:
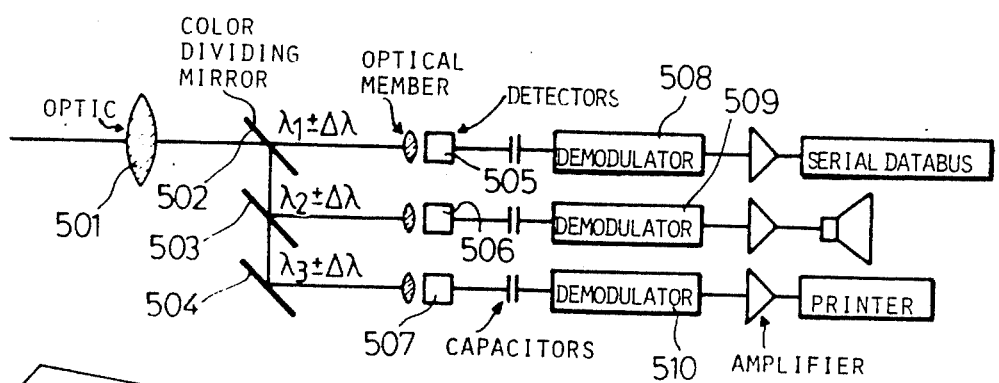
FIG. 5 illustrates a receiver circuit diagram for a multi-channel information transmission.

FIG. 5 shows a receiver circuit arrangement for a multi-channel information transmission system. The separation of the light into different wave length ranges is accomplished by conventional color dividing mirrors 502, 503, and 504. These mirrors reflect light of a selected wave length and they transmit light of the other wave lengths or vice versa. The light divided as just described is supplied to respective photodetectors 505, 506, and 507. Demodulators 508, 509, and 510 are connected through capacitors to the respective detectors 505, 506, and 507. The outputs of the demodulators are connected through amplifiers to peripheral equipment such as a serial databus, a loudspeaker, and/or a printer.

Figure 6:
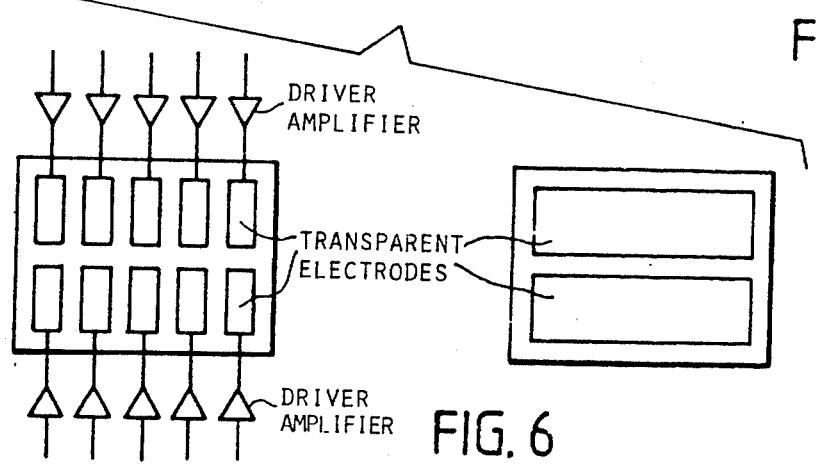
FIG. 6 shows an embodiment of a large surface modulator constructed of a plurality of liquid crystal segments.

FIG. 6 illustrates a large surface liquid crystal cell according to the invention constructed for increasing the density of the data to be submitted. Such increase is accomplished by segmenting the control surfaces of the cell with the aid of photolithographic methods. The large surface area cell is segmented by a plurality of transparent electrodes as shown in FIG. 6. In this manner it is possible to reduce the effective capacity of the modulator to thereby assure a transmission over a wide band width. The righthand portion of FIG. 6 represents the electrode pattern on both sides of the modulator device.

FIG. 7a illustrates a light source 701 arranged for shining its light onto a liquid crystal modulator cell 702. FIG. 7b shows an embodiment in which the light source is a laser 701a. In FIG. 7c the liquid crystal cell is exposed to the light of a retroreflector 706. In FIG. 7d three liquid crystal modulator cells are arranged in a row for a multi-channel information transmission, whereby each cell handles a different wave length of the mixed light coming from the source 701 through a collimator. In order to achieve the response characteristics at different wave lengths in the embodiment of FIG. 7d, the doping density is respectively adapted to the intended wave length ranges. In the case of the cholesteric dopant CB15 (Merek TM), for example, the doping density of the cell A would be 30% for $\lambda = 550$ nm, the doping density for the cell B would be 20% for $\lambda = 800$ nm, and the doping density for the cell C would be 15% for $\lambda = 900$ nm. In each instance a cholesterol type substance would be used as the dopant. The resulting response characteristic is such that, as shown in FIG. 2, the respective modulator has a clear filter or passage characteristic distinct from the other cells. It is also possible to arrange several cells each having a different pass or transmission characteristic as shown in FIG. 7e where the cells A', B', and C' form a column. The arrangements shown in FIGS. 7d and 7e are suitable to simultaneously transmit a large number of information data if a light source is used having a respective broad band emitting range. Each of the liquid crystal modulator cells A, B, and C of FIG. 7d or A', B', C' of FIG. 7e has its own control circuit as shown in FIG. 4.

FIG. 7f discloses a circular type of arrangement of eight modulator cells 700 arranged along the sides of an octagonal, whereby the individual cells are interconnected by mounting members 707. This arrangement permits a panorama type or circular type transmission of the wide band light from a light source 704 provided with a parabolic mirror 705 which may be rotatable about an axis 703. Such an arrangement is suitable, for example, for a lighthouse or beacon. The modulators 700 may be arranged as multi-channel devices as shown, for example, in FIG. 7d with a series arrangement of the individual cells relative to each other.

Figure 8:
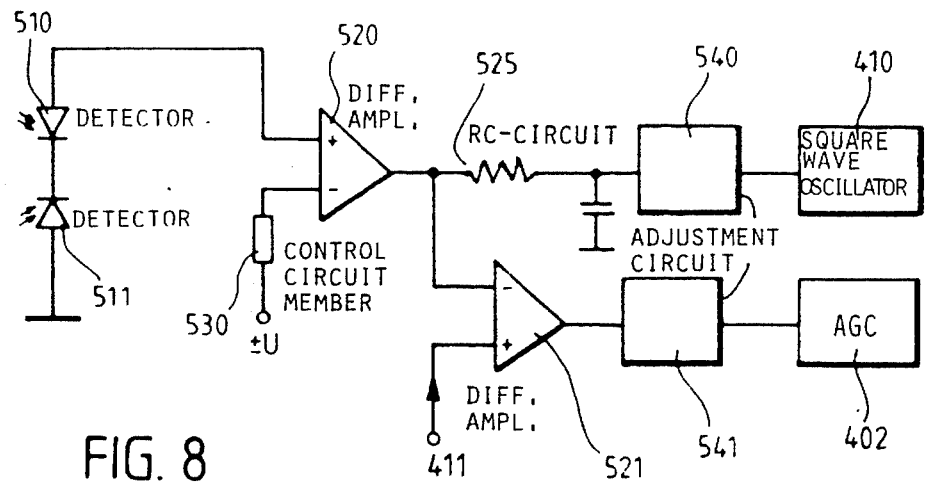
FIG. 8 is a block circuit diagram for reducing the distortion factor of a liquid crystal modulator according to the invention.
Figures 9A, 9B:
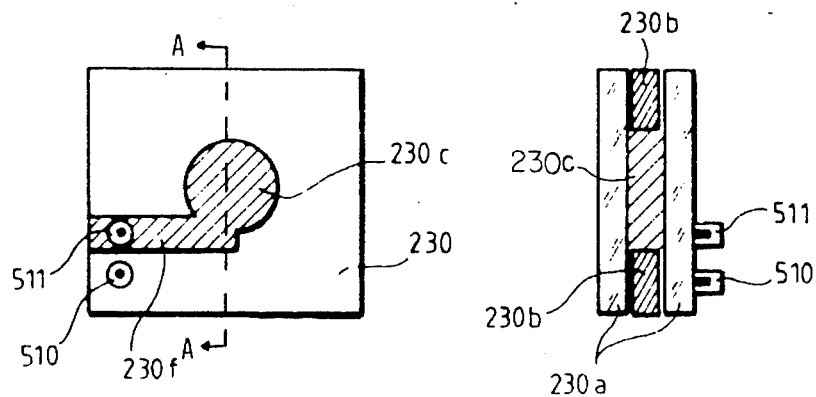

The circuit arrangement of FIG. 8 serves for further improving the transmission quality by reducing the distortion factor. Two photodetectors 510, 511 having a logarithmic voltage response characteristic with a large dynamic voltage are secured to the liquid crystal modulator 230 as shown in FIG. 9a. The photodetector 511 is located in front of a liquid crystal modulating zone or area such as, for example, the filling hole or channel 230f. The photodetector 510 is located outside the zone or zones which is filled with a liquid crystal mixture as best seen in FIGS. 9a and 9b. The radiation picked up by the photodetector 511 is smoothed by an RC-circuit 525 as shown in FIG. 8, whereby, ideally, a voltage is supplied which corresponds to a median or average transmission by the liquid crystal modulator 230. The two photodetectors 510, 511 are connected in anti- or counter-phase fashion so that a difference voltage is applied at the two inputs of the differential amplifier 520. This difference voltage corresponds to the quotient of the two light signals detected by the detectors 510, 511. A control circuit member 530 is initially so adjusted that the operation point $U_{50}$ is established on the characteristic curve shown in FIG. 3a. Any temperature shift of the operational point is automatically compensated by an adjustment through the adjustment circuit 540 which is effective on the voltage controlled square wave oscillator 410 also shown in FIG. 4. A differential amplifier 521 connected with one input to the output of the differential amplifier 520 and with the other input to the adder 411 in FIG. 4, compares the modulated brightness signal with the trigger or control signal of the liquid crystal modulator 413 shown in FIG. 4. Any deviation from a reference value is adjusted through the adjustment circuit 541 shown in FIG. 8 and through the automatic gain control circuit 402 also shown in FIG. 8. In this manner it is possible to compensate any non-linearities that may occur in the characteristic curve of the liquid crystal modulator 413, whereby the distortion factor is substantially reduced.

Incidentally, the cells shown in FIG. 9a and FIG. 9b are quite similar to the other cells, whereby spacers 230b are provided between the glass panes 230a to provide a cavity for the liquid crystal material 230c as shown.

Incidentally, the lowermost wave form shown in FIG. 3b is the modulated signal showing the signal or information representing middle curve modulated onto the carrier wave form shown at the top of FIG. 3b.

The circular type arrangement shown in FIG. 7f is not limited to eight cells. Six cells, for example, could be arranged around a hexagon, or more or fewer cells could be arranged around a square or any other geometrical configuration.

Although the invention has been described with reference to specific example embodiments, it will be appreciated, that it is intended to cover all modifications and equivalents within the scope of the appended claims.

What we claim is:

1. A liquid crystal light modulator operating on the basis of wave length range selection and capable of single or multi-channel transmission of speech or other analog or digital information signals by means of light passing through solid, gaseous, or liquid media, comprising at least two transparent panels (1, 2) spaced by a spacer means (3) to form a gap, conductive electrodes (5) on said panels, a liquid crystal mixture in said gap, said liquid crystal mixture having such a doping that a helical structure is formed, said helical structure having a pitch "p" corresponding approximately to the wave length ($\lambda$) of said light to be modulated by said information signals, means for operating said liquid crystal light modulator with an alternating carrier voltage, and means for modulating said information signals onto said carrier voltage in a proper phase relationship, whereby the frequency and the effective carrier voltage are so selected that the modulation depth is sufficient for the liquid crystal mixture used in said modulator.

2. The light modulator of claim 1, wherein the effective voltage of the information signal to be added to or modulated onto said alternating carrier voltage, is so limited that the saturation voltage of the electro-optical characteristic of said modulator is not reached.

3. The light modulator of claim 1, wherein a multi-channel speech and information transmission is achieved by a serial arrangement or by a column arrangement of a plurality of modulator cells which have respective liquid crystal layers tuned to different wave lengths bands and which are controlled independently of one another.

4. The light modulator of claim 1, wherein a frequency or impulse code demodulation is used for a transmission of digital data free of interferences.

5. The light modulator of claim 1, wherein an analog information signal is modulated onto an oscillating alternating voltage.

6. The light modulator of claim 1, wherein the energizing of the modulator cells takes place in the range of $U_{10}$ to $U_{90}$ of the effective voltage with the aid of an electronic automatic gain control circuit.

7. The light modulator of claim 1, wherein the switching frequency of the alternating carrier voltage is selected so that the modulation depth becomes a maximum.

8. The light modulator of claim 1, wherein, for increasing the signal density, the control surfaces of the modulator are segmented.

9. The light modulator of claim 1, wherein a multi-channel modulating device is arranged around a rotating light emitting device having a parabolic mirror.

10. The light modulator of claim 1, wherein two logarithmically sensitive photodetectors are arranged for cooperation with the liquid crystal modulator in such a way that the output signals of the photodetectors, connected in phase opposition, are supplied to one input of a differential amplifier also connected with its other input to a controller (530).

11. The light modulator of claim 1, wherein the frequency and the effective voltage of the alternating carrier voltage is automatically selected so that the operational point along the characteristic is maintained at the optimal value independently of the temperature of the liquid crystal substance of the modulator.

12. The light modulator of claim 1, wherein said liquid crystal substance is a nematic substance doped with a cholesterol type substance to such an extent that said condition $p \approx \lambda$ is satisfied.

* * * * *